United States Patent
Young et al.

(10) Patent No.: US 7,489,438 B1
(45) Date of Patent: *Feb. 10, 2009

(54) DIELECTRIC COATING FOR AN OPTICAL REPEATER PRESSURE VESSEL

(75) Inventors: Mark K. Young, Monmouth Junction, NJ (US); David S. DeVincentis, Flanders, NJ (US); Savino S. Camporeale, Cranbury, NJ (US); Stephen Arthur Hughes Smith, Chester (GB); Stephen G. Evangelides, Jr., Red Bank, NJ (US)

(73) Assignee: Red Sky Subsea, Ltd., Chelmsford (GB)

( * ) Notice: Subject to any disclaimer, the term of this patent is extended or adjusted under 35 U.S.C. 154(b) by 190 days.

This patent is subject to a terminal disclaimer.

(21) Appl. No.: 10/967,717

(22) Filed: Oct. 18, 2004

Related U.S. Application Data

(63) Continuation-in-part of application No. 10/715,330, filed on Nov. 17, 2003, now Pat. No. 6,917,465.

(51) Int. Cl.
*H04B 10/00* (2006.01)
(52) U.S. Cl. ............... 359/333; 385/92; 398/105
(58) Field of Classification Search ........... 359/333; 385/92; 398/105
See application file for complete search history.

(56) References Cited

U.S. PATENT DOCUMENTS

| | | | |
|---|---|---|---|
| 4,679,250 A | 7/1987 | Davis et al. | 455/601 |
| 4,962,445 A | 10/1990 | Pelet et al. | 361/386 |
| 6,381,394 B1 | 4/2002 | Cabrera et al. | 385/135 |
| 6,571,042 B1 | 5/2003 | Kordahi | 385/100 |
| 6,665,477 B2 | 12/2003 | Toth et al. | 385/100 |
| 6,917,465 B2 * | 7/2005 | Young et al. | 359/333 |

FOREIGN PATENT DOCUMENTS

WO    WO 03/030203 A1    4/2003

* cited by examiner

*Primary Examiner*—Mark Hellner
(74) *Attorney, Agent, or Firm*—Choate, Hall & Stewart LLP; Sam Pasternack

(57) ABSTRACT

An undersea optical repeater is provided. The repeater includes a pressure vessel for use in an undersea environment. The pressure vessel includes a pressure housing and at least two cable reeving elements disposed on opposing ends of the pressure housing for respectively receiving ends of optical cables that each include an electrical conductor therein. The cable receiving elements are adapted to be in electrical contact with the respective electrical conductors in the optical cables. At least one optical amplifier is located in the pressure vessel. The optical amplifier includes at least one electrical component adapted to receive electrical power from the electrical conductors in the optical cables. The pressure housing includes a dielectric layer having sufficient dielectric properties for electrically isolating the cable receiving elements from one another to provide a voltage thereacross.

34 Claims, 8 Drawing Sheets

DIELECTRIC COATING FOR AN OPTICAL REPEATER PRESSURE VESSEL

RELATED APPLICATIONS

This application is related to U.S. application Ser. No. 10/687,547, filed Oct. 16, 2003, entitled "Optical Amplifier Module Housed In A Universal Cable Joint For An Undersea Optical Transmission System," and U.S. application Ser. No. 10/967,720, entitled "Ternary Ceramic Dielectric Coating For An Optical Repeater Pressure Vessel," filed on even data herewith, and is a continuation-in-part and claims the benefit of priority of U.S. application Ser. No. 10/715,330, filed Nov. 17, 2003 now U.S. Pat. No. 6,917,465, entitled "Method and Apparatus for Electrically Isolating an Optical Amplifier Module Housed In A Universal Cable Joint." Each of these prior applications is incorporated herein by reference in its entirety.

FIELD OF THE INVENTION

The present invention relates to the field of optical repeaters, and more particularly to an optical repeater employed in an undersea optical transmission system.

BACKGROUND OF THE INVENTION

Undersea optical communication systems include land-based terminals containing transmitters and receivers connected by a cabled-fiber-transmission medium that includes periodically spaced repeaters, which contain optical amplifiers whose purpose is to compensate for the optical attenuation in the cabled fiber. In a bidirectional transmission system each repeater will generally contain two or more optical amplifiers, one for each of the oppositely-directed transmission paths. As the repeaters are usually placed undersea and away from power sources, power must be supplied remotely to the repeaters. The cabled fiber therefore usually contains a copper conductor to carry electrical power to the repeaters from the terminals. These undersea systems serve to carry optical communication signals (i.e., traffic) between the terminals. The traffic on these systems can consist of voice, data, television, Internet traffic, international telephone traffic, etc. Consequently, the revenue lost when the system is down can be significant. Therefore, these systems must have high reliability and availability.

Recently, ultra-small form factor optical repeaters for undersea use have been developed which have dimensions that are substantially smaller than that of conventional undersea optical repeaters. One example of such a repeater is disclosed in co-pending U.S. application Ser. No. 10/687,547 and U.S. application Ser. No. 10/715,330, which are hereby incorporated by reference in their entirety. One example of the repeater shown in these references has dimensions of only about 7.5 cm×15 cm.

FIG. 1 shows a side view of such an ultra-small form factor repeater. The repeater 100 includes a pressure vessel comprising a cylindrical metallic housing 110 and metallic end caps $120_1$ and $120_2$ that are secured to opposing ends of the cylindrical housing 110. The cylindrical housing 110 must withstand high undersea hydrostatic pressures and remain hermetic for at least 25 years. The pressure vessel must also be corrosion resistant or at least capable of being coated with an anticorrosion component. Suitable materials that are often employed include a high-strength grade of copper-beryllium and steel.

Optical cables $130_1$ and $130_2$ enter the repeater 100 through the end caps $120_1$ and $120_2$, respectively. Optical cables $130_1$ and $130_2$ include an electrical conductor for supplying electrical power to the electrical components located in the repeater 100. The electrical conductors in the optical cables are in electrical communication with the respective end caps $120_1$ and $120_2$. In order to drop power to the electrical components a voltage must be established between the end caps $120_1$ and $120_2$. To accomplish the necessary voltage drop, electrical continuity must be interrupted between the end caps 120. Accordingly, some provision for interrupting electrical continuity needs to be provided since the housing 110 is generally formed from a metallic material.

Unfortunately, changing the material from which the housing 110 is formed from a conductive to a dielectric material is problematic because of the substantial structural and thermal demands placed on it. Not only must be the housing 110 be formed from a material strong enough to withstand the hydrostatic pressures of the undersea environment, but it must also be sufficiently thermally conductive to dissipate the waste heat generated by the electrical components within it. Very few available materials can provide the strength needed in such a small volume with the required thermal conductivity. Moreover, most materials that can provide the required strength and thermal conductivity are also good electrical conductors since thermal and electrical conductivity usually go hand in hand because they both arise from the mobility of electrons within the material).

Accordingly, it would be desirable to provide a pressure vessel for an undersea optical repeater that meets the stringent structural, thermal and electrical properties that such a pressure vessel requires.

SUMMARY OF THE INVENTION

In accordance with the present invention, an undersea optical repeater is provided. The repeater includes a pressure vessel for use in an undersea environment. The pressure vessel includes a pressure housing and at least two cable receiving elements disposed on opposing ends of the pressure housing for respectively receiving ends of optical cables that each include an electrical conductor therein. The cable receiving elements are adapted to be in electrical contact with the respective electrical conductors in the optical cables. At least one optical amplifier is located in the pressure vessel. The optical amplifier includes at least one electrical component adapted to receive electrical power from the electrical conductors in the optical cables. The pressure housing includes a dielectric layer having sufficient dielectric properties for electrically isolating the cable receiving elements from one another to provide a voltage thereacross.

In accordance with one aspect of the invention, the dielectric layer is an oxide layer.

In accordance with another aspect of the invention, the pressure housing is formed from a metallic material.

In accordance with another aspect of the invention, the pressure housing is formed from a metallic material.

In accordance with another aspect of the invention, the metallic material includes stainless steel having chromium therein.

In accordance with another aspect of the invention, the said oxide layer is a chromium oxide layer.

In accordance with another aspect of the invention, the oxide layer is an oxide layer formed from oxidation of the pressure housing.

In accordance with another aspect of the invention, the oxide layer is an oxide layer applied to the pressure housing.

In accordance with another aspect of the invention, the applied oxide layer is applied by a technique selected from the group consisting of thermal spraying and chemical vapor deposition.

In accordance with another aspect of the invention, the pressure housing is formed from an electrically conductive ceramic material.

In accordance with another aspect of the invention, the oxide layer arise from oxidation of the electrically conductive ceramic material.

In accordance with another aspect of the invention, the pressure vessel is a pressure vessel adapted for an undersea optical fiber cable joint.

In accordance with another aspect of the invention, the pressure vessel is a pressure vessel adapted for a universal cable joint for jointing optical cables having different configurations.

In accordance with another aspect of the invention, an optical amplifier module located within the pressure vessel is provided for containing the optical amplifier.

DETAILED DESCRIPTION

The present inventors have recognized that a dielectric layer can be applied to the outer surface of a pressure vessel that serves as an optical repeater housing. The dielectric layer, which in some embodiments of the invention is an oxide layer, has a resistivity that is sufficient to establish a voltage between the end caps of the pressure vessel, which voltage can be used to power the electrical components contained within the optical repeater.

Figure 1:
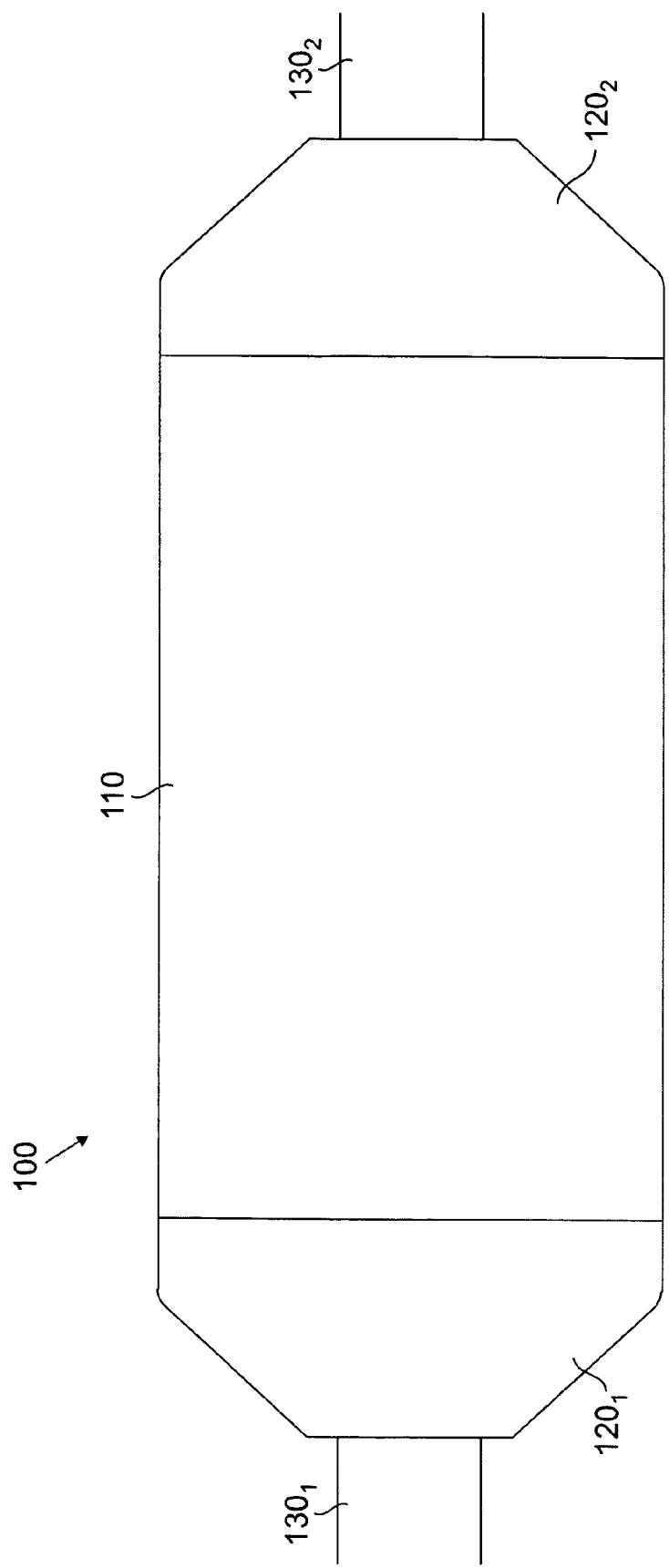
FIG. 1 shows a side view of a conventional pressure vessel for an undersea optical repeater.
Figure 2:
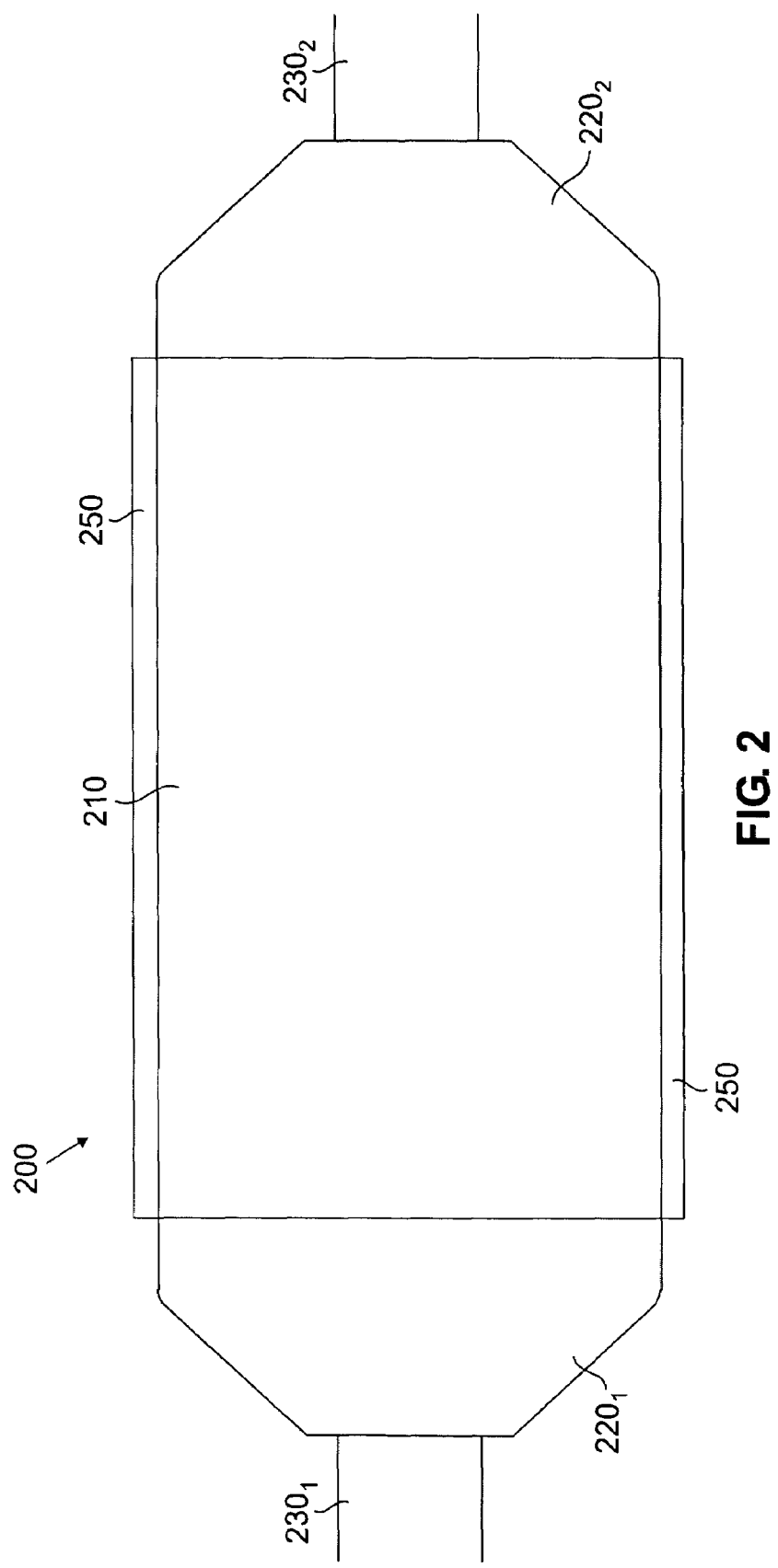
FIG. 2 shows a side view of a pressure vessel having a dielectric layer constructed in accordance with the present invention.

FIG. 2 shows a side view of one example of a repeater in which the present invention may be employed. The repeater 200 includes a pressure vessel comprising a cylindrical metallic housing 210 and metallic end caps $220_1$ and $220_2$ that are secured to opposing ends of the cylindrical housing 210. Optical cables $230_1$ and $230_2$ enter the repeater 200 through the end caps $220_1$ and $220_1$, respectively. End caps $220_1$ and $220_2$ are coupled via intermediate coupling means (not shown), for example, using a threaded connection, so that mechanical loads may be transferred from cable $230_1$ to cable $230_2$, and vice versa, such that mechanical continuity is provided to the larger communication cable formed by the joining of the cable segments. End caps $230_1$ and $230_2$, in this illustrative example, are shaped as a frustum. However, it is emphasized that the selection of this particular shape for end caps $230_1$ and $230_2$ is merely illustrative, as the invention is intended to encompass other shapes as well. The large end of the cone abuts the end of cylindrical housing 210 and the smaller end of the cone includes an opening to permit passage of the cables $230_1$ and $230_2$ into the interior space of repeater 200. In some designs, the end caps $220_1$ and $220_2$ may be fastened to the housing 210, using, for example, conventional fastening means, such that the housing 210 also is a load-bearing member of the repeater.

Pressure vessel housing 210 is utilized to create an interior space in repeater 210 which contains the various electrical and optical components of the repeater such as erbium doped fiber, pump sources, couplers and the like. It is noted that the interior space of housing 210 and the contents therein, are not particularly pertinent to the invention at hand, and therefore, except in one example presented below for illustrative purposes, no further details regarding such space and contents are provided herein.

As previously mentioned, end caps $220_1$ and $220_2$ are electrically active because they are in contact with the power conductor located in cables $230_1$ and $230_2$, respectively. In order to drop a predetermined voltage to the electrical components within the repeater, housing 210 must be configured so that is does not provide an electrically conductive path between the end caps $220_1$ and $220_2$.

In accordance with one embodiment of the present invention, an oxide layer 250 is applied to the outer surface of the pressure vessel housing 210. The oxide layer 250 should have a sufficient thickness to provide the necessary dielectric properties and still remain structurally strong. For example, if the housing is formed from stainless steel having a sufficient chromium content, the housing can be oxidized to form a chromium oxide dielectric surface layer. Alternatively, such an oxide dielectric layer can be applied to the stainless steel housing by a variety of techniques such as thermal spraying and chemical vapor deposition, for example.

In other embodiments of the invention the housing 210 may be formed from various electrically conductive ceramics instead of stainless steel. Suitable ceramics include those on which a stable oxide layer can be formed. For example, ceramics that include aluminum, silicon, and titanium can be oxidized to provide the outer dielectric layer.

In some embodiments of the invention the internal electrical and optical components of the repeaters are located in an optical amplifier module 400 of the type depicted in FIGS. 3-6 and which is disclosed in copending U.S. application Ser. No. 10/687,547 and U.S. application Ser. No. 10/800,424. Optical amplifier module 400 is designed to fit within a pressure vessel that typically serves as a universal cable joint for jointing fiber optical cables for use n undersea optical telecommunications systems. The optical amplifier module 400 depicted in the figure can support 4 erbium-doped fiber amplifiers (EDFAs), physically grouped as a dual amplifier unit for each of two fiber pairs. Of course, the present invention encompasses optical amplifier modules that can support any number EDFAs.

Each optical amplifier includes an erbium doped fiber, an optical pump source, an isolator and a gain flattening filter (GFF). The amplifiers are single-stage, forward pumped with cross-coupled pump lasers. A 3 dB coupler allows both coils of erbium doped fiber in the dual amplifier to be pumped if one of the two pump lasers fails. At the output, an isolator protects against backward-scattered light entering the amplifier. The gain flattening filter is designed to flatten the amplifier gain at the designed input power. An additional optical path may be provided to allow a filtered portion of the backscattered light in either fiber to be coupled back into the opposite direction, allowing for COTDR-type line-monitoring. Of course, optical amplifier module 400 may support EDFAs having different configurations such as multistage amplifiers, forward and counter-pumped amplifiers, as well as fiber amplifiers that employ rare-earth elements other than erbium.

Figure 3:
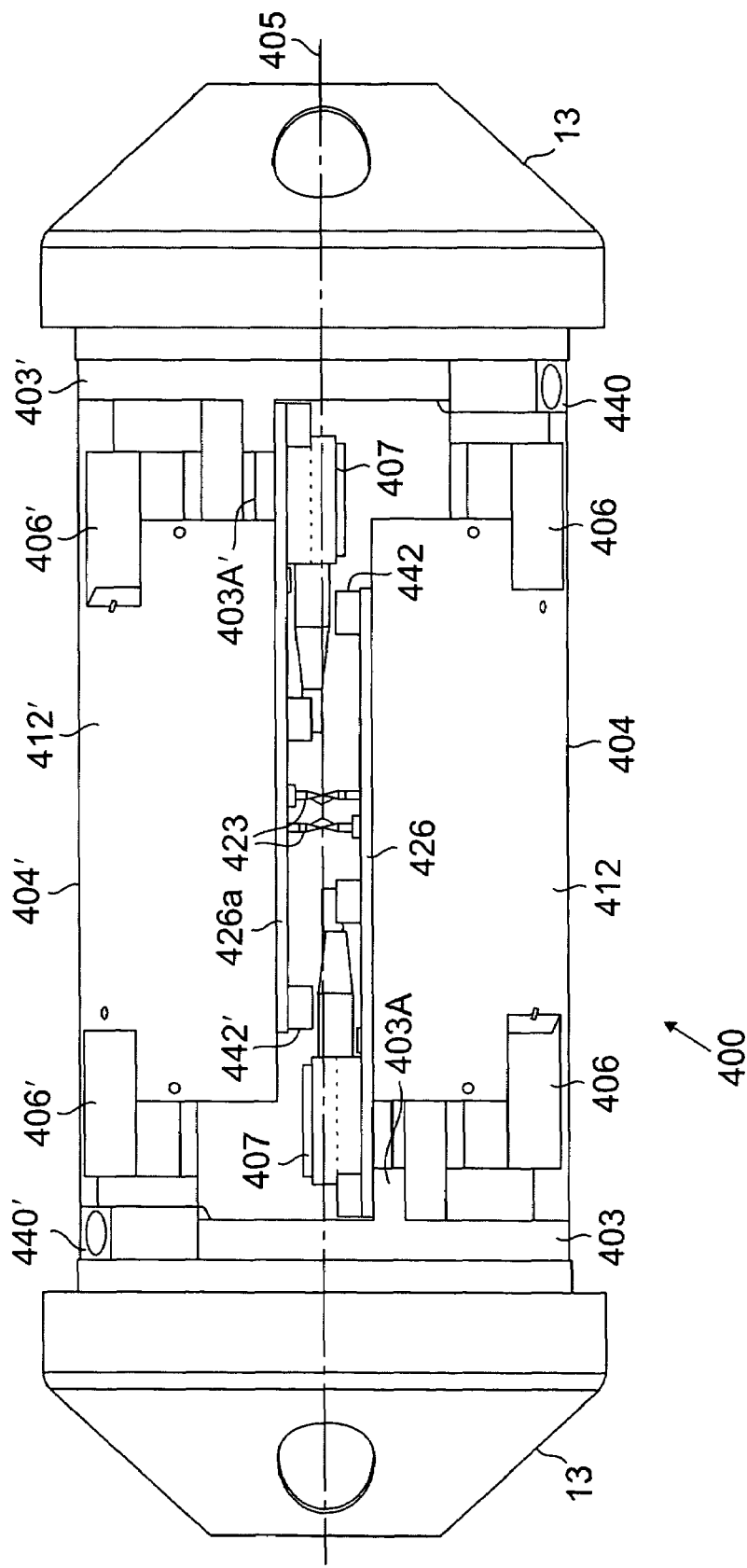
FIG. 3 shows a side view of an optical amplifier module that may be employed in a repeater constructed in accordance with the present invention.
Figure 4:
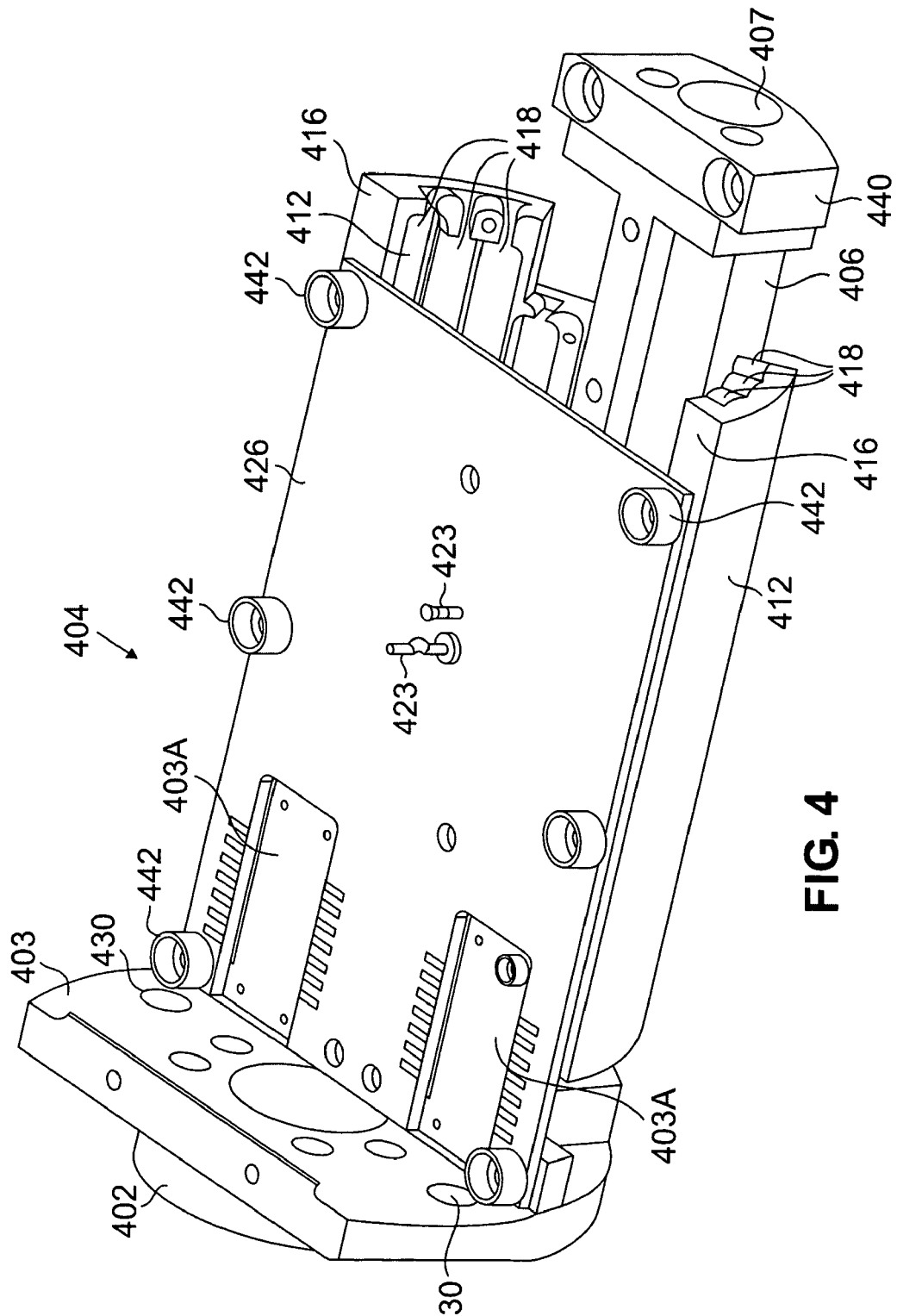
FIG. 4 shows a perspective view of one of the half units that form the optical amplifier module depicted in FIG. 3.

A side view of optical amplifier module 400 is shown in FIG. 3 with the end caps 13 (corresponding to end caps 220 in FIG. 2) in place but without the cylindrical housing 210. The module 400 is defined by a generally cylindrical structure having flanges 402 (seen in FIG. 4) located on opposing end faces 403. A longitudinal plane 405 extends through the optical amplifier module 400 to thereby bisect the module 400 into two half units 404 and 404' that are symmetric about a rotational axis perpendicular to the longitudinal plane 405. That is, as best seen in FIG. 4, rather than dividing the end faces 403 into two portions located on different half units 404, each half unit 404 includes the portion of one of the end faces 403 on which a respective flange 402 is located. FIG. 4 shows a perspective view of one of the units 404. In the embodiment of the invention depicted in FIGS. 3-8, each half unit 404 houses two erbium-doped fiber amplifiers.

Flanges 402 mate with cable termination units (not shown) of the aforementioned universal joint. As seen in the cross-sectional views of FIGS. 6 and 7, through-holes 407 extend inward from the end faces 403 through which the tension rod of the universal joint are inserted. The end faces 403 also include clearance holes 430 for securing the end caps to the optical amplifier module 400. The clearance holes 430 are situated along a line perpendicular to the line connecting the tension rods thru-holes 407.

Figure 5:
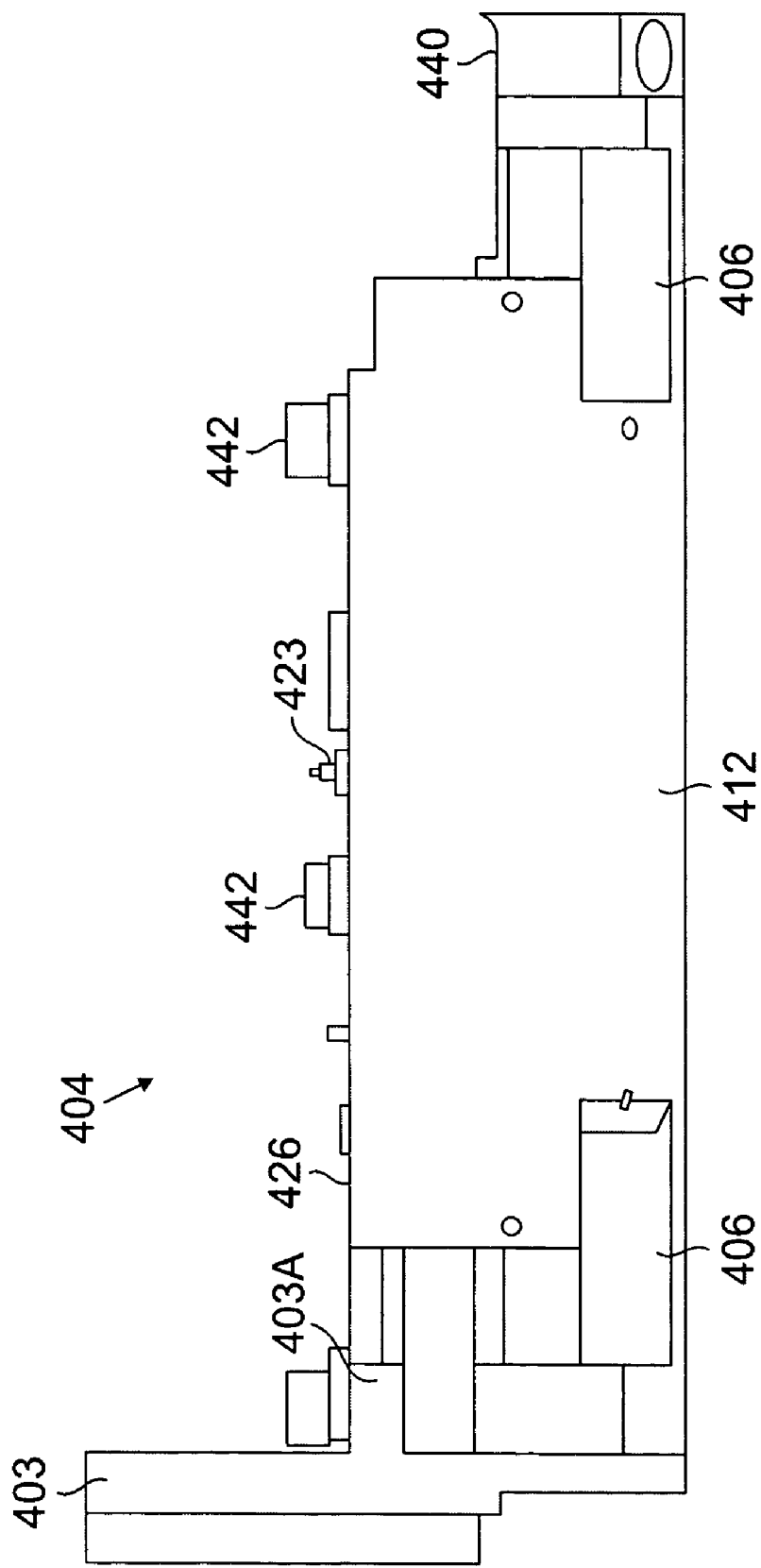
FIG. 5 shows a side view of one of the half units that form the optical amplifier module depicted in FIG. 3.
Figure 6:
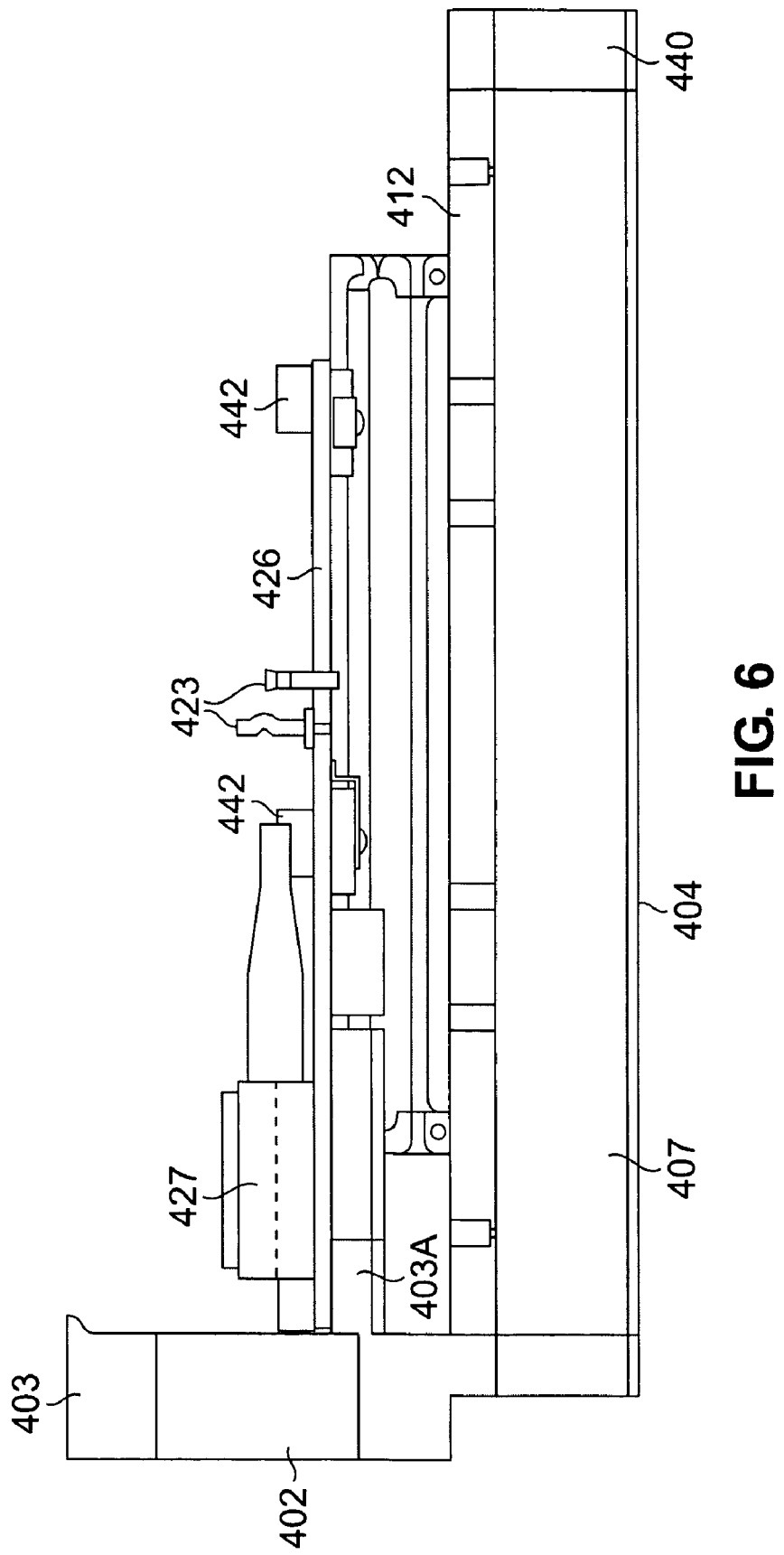
FIG. 6 shows a cross-sectional side view one of the half units that form the optical amplifier module depicted in FIG. 3.
Figure 7:
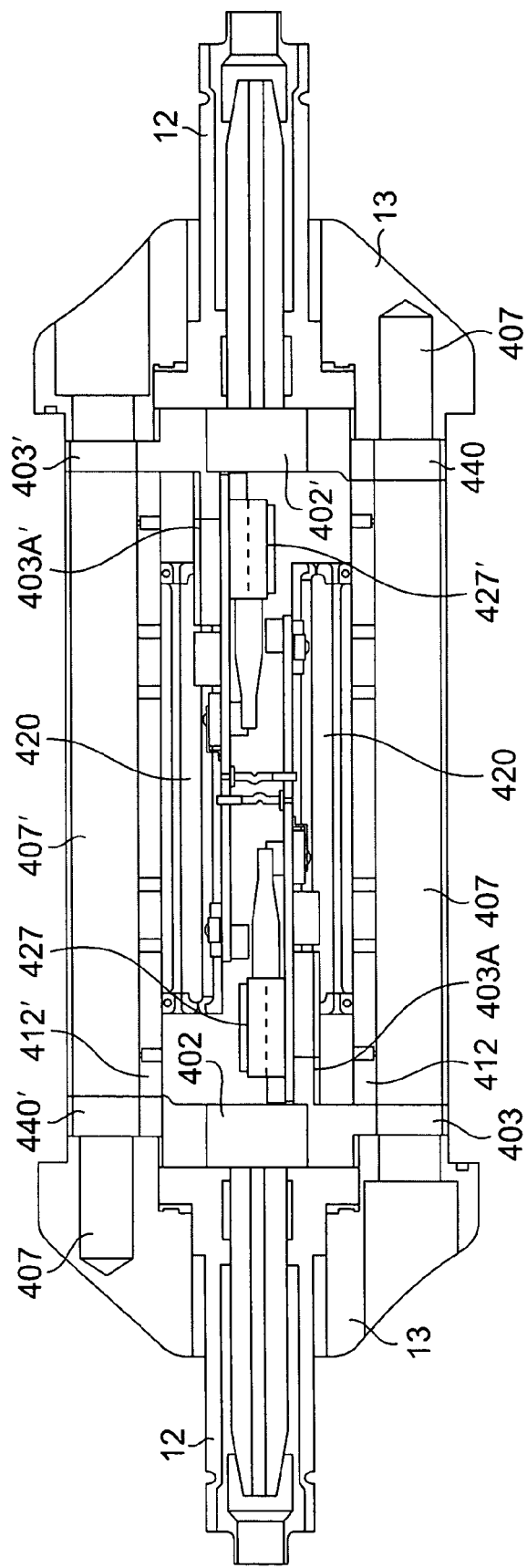
FIG. 7 is cross-sectional side view of the optical amplifier module shown in FIG. 3.
Figure 8:
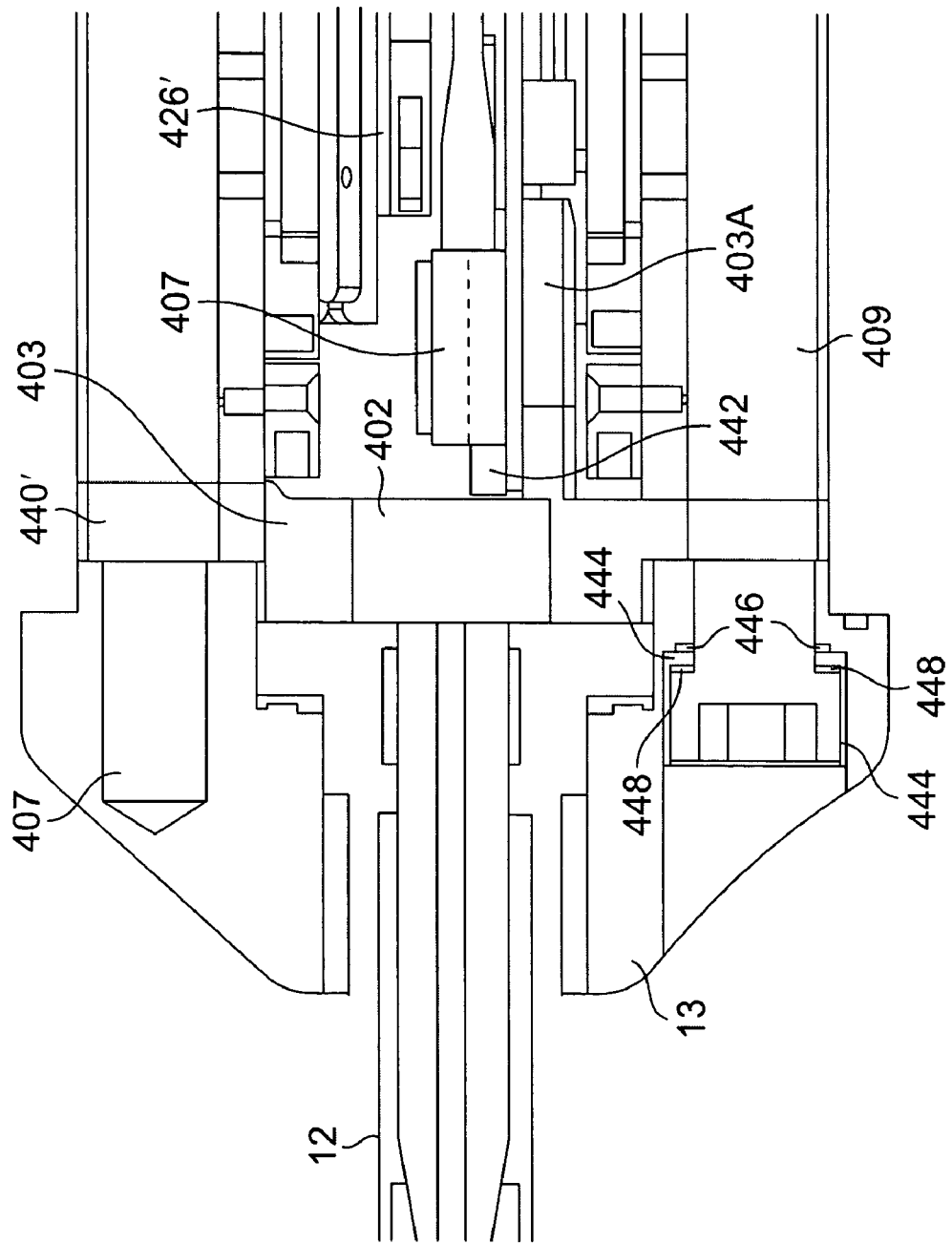
FIG. 8 is an enlarged, cross-sectional side view of the portion of the optical amplifier module that interconnects with the end cap.

As shown in FIGS. 3-5, each unit 404 includes curved sidewalls 412 forming a half cylinder that defines a portion of the cylindrical structure. A spinal member 406 is integral with and tangent to the curved sidewalls 412 and extends longitudinally therefrom. The thru hole 407 containing the tension rod of the universal joint extends through the spinal member 406. A ceramic boss 440 is located on the end of the spinal member 406 remote from the end flange 403. As shown in FIGS. 4 and 6, the thru hole 407 extends through the ceramic boss 440. As discussed below, the ceramic boss 440 prevents the flow of current from one half unit 404 to the other.

A circuit board support surface 416 extends along the periphery of the unit 404 in the longitudinal plane 405. Circuit board 426 is mounted on support surface 416. When the half units 404 and 404' are assembled, circuit boards 426 and 426' are interconnected by a pair of interlocking conductive power pins 423 that provide electrical connectivity between the two circuit boards 426 and 426'. The inner cavity of the unit 404 located between the circuit board support surface 416 and the spinal member 406 serves as an optical fiber storage area. Optical fiber spools 420 are located on the inner surface of the spinal member 406 in the optical fiber storage area. The erbium doped fibers, as well as any excess fiber, are spooled around the optical fiber spools 420. The optical fiber spools 420 have outer diameters that are at least great enough to prevent the fibers from bending beyond their minimum specified bending radius.

The curved sidewalls 412 are sufficiently thick to support a plurality of thru-holes 418 that extend therethrough in the longitudinal direction. The thru-holes 418 serve as receptacles for the passive components of the optical amplifiers. That is, each receptacle 418 can contain a component such as an isolator, gain flattening filter, coupler and the like.

End faces 403 each include a pair of pump support bosses 403a (see FIGS. 5 and 6) that extend inward and parallel to the circuit board 426. The circuit board 426 has cut-outs so that the pump support bosses 403a are exposed. A pump source 427 that provides the pump energy for each optical amplifier is mounted on each pump boss 403a.

The invention claimed is:

1. An undersea optical repeater, comprising:
   a pressure vessel for use in an undersea environment, said pressure vessel including a pressure housing and at least two cable receiving elements disposed on opposing ends of the pressure having for respectively receiving ends of optical cables that each include an electrical conductor therein, said cable receiving elements adapted to be in electrical contact with the respective electrical conductors in the optical cables;
   at least one optical amplifier located in the pressure vessel, said optical amplifier including at least one electrical component adapted to receive electrical power from the electrical conductors in the optical cables; and
   wherein said pressure housing includes a dielectric layer having a sufficient dielectric properties for electrically isolating the cable receiving elements from one another to provide a voltage thereacross.

2. The undersea optical repeater of claim 1 wherein said dielectric layer is an oxide layer.

3. The undersea optical repeater of claim 1 wherein said pressure housing is formed from a metallic material.

4. The undersea optical repeater of claim 2 wherein said pressure housing is formed from a metallic material.

5. The undersea optical repeater of claim 4 wherein said metallic material includes stainless steel having chromium therein.

6. The undersea optical repeater of claim 5 wherein said oxide layer is a chromium oxide layer.

7. The undersea optical repeater of claim 2 wherein said oxide layer is an oxide layer formed from oxidation of the pressure housing.

8. The undersea optical repeater of claim 4 wherein said oxide layer is an oxide layer formed from oxidation of the pressure housing.

9. The undersea optical repeater of claim 2 wherein said oxide layer is an oxide layer applied to the pressure housing.

10. The undersea optical repeater of claim 9 wherein said applied oxide layer is applied by a technique selected from the group consisting of thermal spraying and chemical vapor deposition.

11. The undersea optical repeater of claim 1 wherein said pressure housing is formed from an electrically conductive ceramic material.

12. The underseas optical repeater of claim 2 wherein said pressure housing is formed from an electrically conductive ceramic material.

13. The undersea optical repeater of claim 12 wherein said oxide layer arises from oxidation of the electrically conductive ceramic material.

14. The undersea optical repeater of claim 1 wherein said pressure vessel is a pressure vessel adapted for an undersea optical fiber cable joint.

15. The undersea optical repeater of claim 1 wherein said pressure vessel is a pressure vessel adapted for a universal cable joint for jointing optical cables having different configurations.

16. The undersea optical repeater of claim 1 further comprising an optical amplifier module located within the pressure vessel for containing said at least one optical amplifier.

17. The undersea optical repeater of claim 16 wherein said optical amplifier module comprises:
- an internal housing having an outer dimension substantially equal to an outer dimension of an internal fiber splice housing of an undersea optical fiber cable joint, said internal housing including:
- a pair of opposing end faces each having a retaining element for retaining the internal housing within an outer housing of said undersea optical fiber cable joint;
- a sidewall interconnecting said opposing end faces and extending between said opposing end faces in a longitudinal direction, said sidewall including a receptacle portion having a plurality of thru-holes each being sized to receive a passive optical component employed in an optical amplifier; and
- at least one circuit board on which reside electronics associated with the optical amplifier.

18. A method of forming an undersea optical repeater, said method comprising the steps of:
- fabricating a pressure vessel for use in an undersea environment, said pressure vessel including a pressure housing and at least two cable receiving elements disposed on opposing ends of the pressure housing for respectively receiving ends of optical cables that each include an electrical conductor therein, said cable receiving elements adapted to be in electrical contact with the respective electrical conductors in the optical cables;
- providing in said pressure vessel at least one optical amplifier located in the pressure vessel, said optical amplifier including at least one electrical component adapted to receive electrical power from the electrical conductors in the optical cables; and
- wherein said pressure vessel fabrication step includes the step of providing on an outer surface of the pressure vessel a dielectric layer having a sufficient dielectric properties for electrically isolating the cable receiving elements from one anther to provide a voltage thereacross.

19. The method of claim 18 wherein said dielectric layer is an oxide layer.

20. The method of claim 18 wherein said fabrication step includes the step of forming the pressure housing from a metallic material.

21. The method of claim 19 wherein said fabrication step includes the step of forming the pressure housing from a metallic material.

22. The method of claim 21 wherein said metallic material includes stainless steel having chromium therein.

23. The method of claim 22 wherein said oxide layer is a chromium oxide layer.

24. The method of claim 19 wherein said oxide layer is an oxide layer formed from oxidation of the pressure housing.

25. The method of claim 21 wherein the fabrication step includes the step of oxidizing the pressure housing to form said oxide layer.

26. The method of claim 21 wherein the fabrication step includes the step of applying said oxide layer to the pressure housing.

27. The method of claim 26 wherein said applying step is performed by a technique selected from the group consisting of thermal spraying and chemical vapor deposition.

28. The method of claim 18 wherein said fabrication step includes the step of fabricating the pressure housing from an electrically conductive ceramic material.

29. The method of claim 19 wherein said fabrication step includes the step of fabricating the pressure housing from an electrically conductive ceramic material.

30. The method of claim 29 wherein said fabrication step includes the step of oxidizing the electrically conductive ceramic material to form said oxide layer.

31. The method of claim 18 wherein said fabrication step comprises the step of fabricating said pressure vessel from a pressure vessel adapted for an undersea optical fiber cable joint.

32. The method of claim 18 wherein said fabrication step comprises the step fabricating the pressure vessel from a pressure vessel adapted for a universal cable joint for jointing optical cables having different configurations.

33. The method of claim 18 further comprising the step of locating an optical amplifier module within the pressure vessel for containing said at least one optical amplifier.

34. The method of claim 33 wherein said optical amplifier module comprises:
- an internal housing having an outer dimension substantially equal to an outer dimension of an internal fiber splice housing of an undersea optical fiber cable joint, said internal housing including:
- a pair of opposing end faces each having a retaining element for retaining the internal housing within an outer housing of said undersea optical fiber cable joint;
- a sidewall interconnecting said opposing end faces and extending between said opposing end faces in a longitudinal direction, said sidewall including a receptacle portion having a plurality of thru-holes each being sized to receive a passive optical component employed in an optical amplifier; and
- at least one circuit board on which reside electronics associated with the optical amplifier.

* * * * *

UNITED STATES PATENT AND TRADEMARK OFFICE
CERTIFICATE OF CORRECTION

PATENT NO.        : 7,489,438 B1
APPLICATION NO. : 10/967717
DATED             : February 10, 2009
INVENTOR(S)       : Mark K Young et al.

Page 1 of 1

It is certified that error appears in the above-identified patent and that said Letters Patent is hereby corrected as shown below:

Claim 18:
Column 7, line 37: delete "anther" and insert --another--.

Signed and Sealed this

Twenty-fourth Day of March, 2009

JOHN DOLL
*Acting Director of the United States Patent and Trademark Office*